Dec. 11, 1962 R. K. TITUS 3,067,507
METHOD OF MAKING SANDWICH STRUCTURES
Filed Feb. 7, 1958
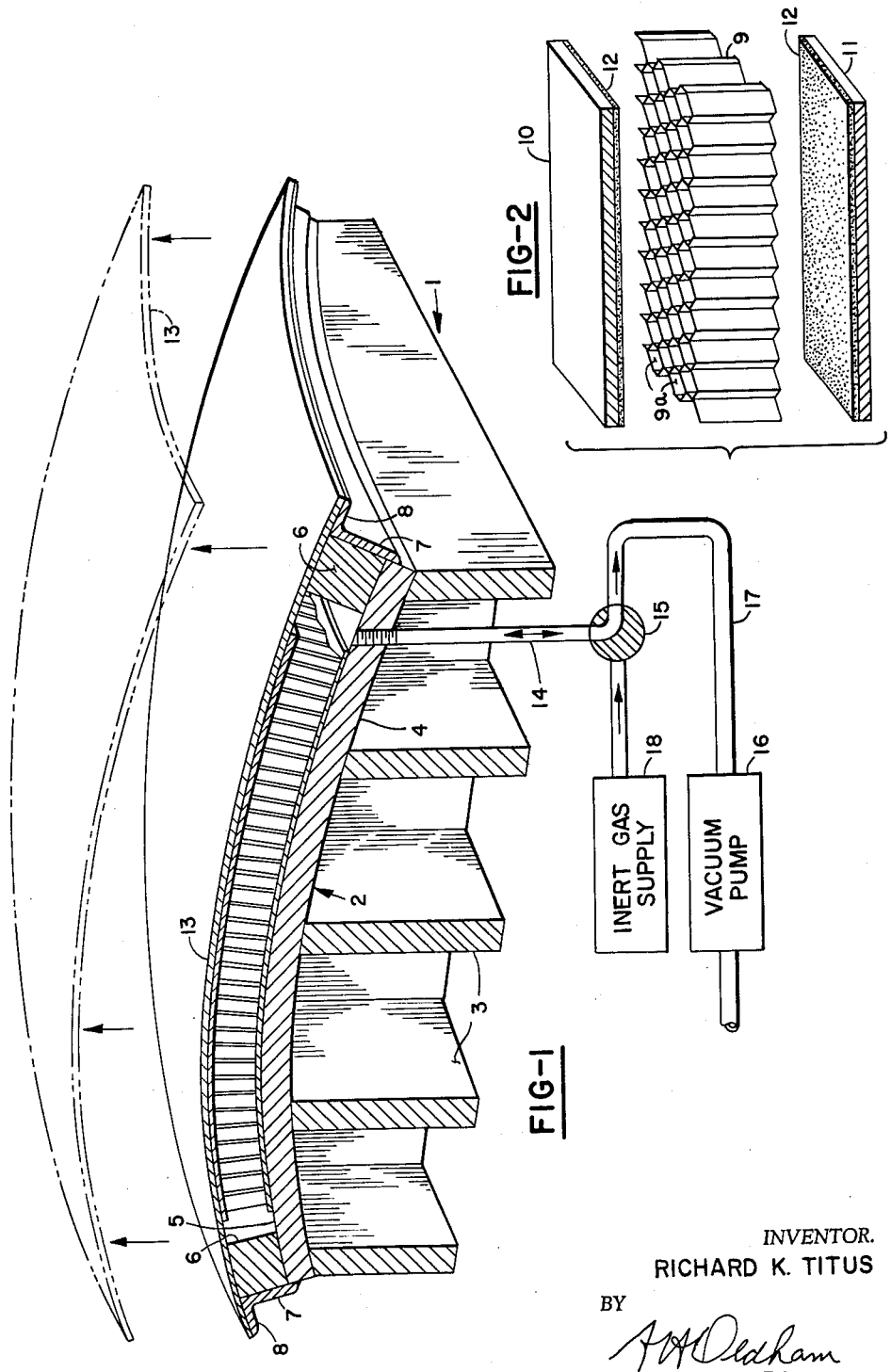
INVENTOR.
RICHARD K. TITUS
BY
*H. H. Oldham*
ATTORNEY United States Patent Office 3,067,507
Patented Dec. 11, 1962

3,067,507
METHOD OF MAKING SANDWICH STRUCTURES
Richard Kern Titus, Campbell, Calif., assignor to Goodyear Aircraft Corporation, Akron, Ohio, a corporation of Delaware
Filed Feb. 7, 1958, Ser. No. 713,818
4 Claims. (Cl. 29—471.1)

The present invention relates to a method of making an arcuately contoured composite metal structure comprising a honeycomb metal foil center member with the openings therein extending from top to bottom of the honeycomb structure, and thin metal cover sheets on the top and bottom of the honeycomb unit and brazed, or otherwise secured thereto.

Heretofore there have been many different types of metal bonding techniques provided wherein composite metal structures can be made. One important type of a composite metal construction is that utilizing honeycomb center sections and top and bottom cover sheets to provide so-called metal "sandwiches." Such units, after the components are secured together, have great strength to low weight ratio.

The general object of the present invention is to provide a novel and improved method of making arcuately contoured metal sandwiches characterized by the shaping of the top and bottom sheets of the sandwich to the desired contour prior to actual bonding of the components of the sandwich together.

Another object of the invention is to provide a metal sandwich wherein the components thereof are assembled in an arcuately contoured holding jig, a slightly flexible cover is placed thereover and made into an air tight compartment with the jig in which the sandwich components are positioned, and a vacuum is established in the jig assembly and holding chamber for tightly retaining the stainless steel sandwich in a desired shape to permit effective bonding or integrating action between the components of the stainless steel sandwich.

The foregoing and other objects and advantages of the present invention will be made more apparent as the specification proceeds.

Attention now is directed to the accompanying drawings showing a currently preferred embodiment of the present invention, wherein:

FIG. 1 is a perspective view, partially broken away and shown in section, of apparatus for practicing the method of the invention and embodying the principles of the invention; and FIG. 2 is an exploded perspective view of the components of the metal sandwich shown in FIG. 1.

When referring to corresponding parts shown in the drawings and referred to in the specification, corresponding numerals are used to facilitate comparison therebetween.

The present invention relates to a jig for making an assembly of a honeycomb core and top and bottom cover sheets of a metal sandwich and wherein the jig comprises an open top box-like frame having a curved base surface and outwardly directed metal flanges flush with the top of the frame, which frame is adapted to receive an assembly of a honeycomb core and top and bottom contoured cover plates or sheets thereon to lie within the frame substantially flush with the top thereof, port means connecting to the interior of the frame, and a flexible metal, pre-contoured cover welded to the outer edges of the top metal flanges to form an air tight enclosure therewith so that the metal cover can be tightly pressed against any assembly within the jig by evacuating the enclosure formed in the jig of the invention. The invention also relates to a method of forming a metal sandwich by use of the apparatus disclosed, or its equivalent.

Reference now should be had to the details of the structure shown in the drawings, and the jig of the invention is indicated as a whole by the numeral 1. The jig 1 includes an open top box-like frame 2 that may have a plurality of reenforcing members 3 secured to a portion of the frame 2 and extending therefrom for reenforcing a curved base sheet 4 that provides a curved support surface or layer 5 in a bottom portion of the jig 1. The jig 1 and the frame 2 thereof also include side members 6 at the margins thereof. Usually some type of metal angles 7 are secured to the side members 6 and provide laterally outwardly extending top legs or flanges 8 that are substantially flush with the top surface of the side members 6.

Normally the support surface 5 provided in the frame 2 is curved in two directions and the jig 1 is adapted to receive therein an assembly of metal components having uniform height in the center opening of the frame. Specifically a honeycomb core 9 and top and bottom cover sheets or layers 10 and 11, respectively, thereover are provided to be made into a metal sandwich by practice of the invention. This core 9 may be made from any conventional material and usually is formed from thin, flexible aluminum sheets secured together at spaced locations thereof in conventional manners so that the core can be expanded to have bores or holes 9a extending therethrough from top to bottom thereof. This core 9 is flexible and will readily adapt itself to a curved contour such as that of the curved support surface 5 in the frame 2. The top and bottom cover sheets 10 and 11 usually are made from relatively light gauge metal plates, such as stainless steel, and these top and bottom plates are pre-contoured to a contour substantially corresponding to that of the curved support surface 5. The core 9 is of such a height that when the metal member assembly is positioned within the frame 2, as illustrated, then the top surface of the top cover plate 10 is substantially flush with the upper margins of the side members 6 and top legs 8 of the angle 7.

Prior to positioning the top and bottom cover sheets 10 and 11 in the frame 2, they are provided with a covering of brazing compound, or suitable thermoplastic adhesive material 12, or equivalent bonding material thereon.

As a next and important step in the assembly of the jig 1 and in practicing the method of the invention, a pre-contoured flexible cover sheet 13 is provided. This cover sheet 13 corresponds to the contour of the curved support surface 5 and is slightly flexible for a purpose to be described hereinafter in more detail. The lateral margins of this cover sheet 13 are secured as by a seam weld to the lateral margins of the top legs 8 of the angles 7 to form an air tight enclosure with such angles and the remainder of the frame 2. Normally the assembly of the core and top and bottom cover sheets is smaller in size than the open center portion provided in the frame 2 and a tube 14 is shown connecting to and extending through a portion of the frame 2 to connect to the interior thereof. This tube 14 extends to a control valve 15 that connects to a conventional vacuum pump 16 by a tube 17. Thus when desired, the valve 15 can be set so that when the pump 16 operates, the frame 2 and the open center portion thereof will be evacuated. Such action causes the ambient air pressure to force the flexible cover sheet 13 tightly against the metal assembly positioned within the open center of the frame 2 and retain the components thereof in tight assembled relation. Thereafter, if desired, the position of the valve 15 can be changed and inert gas can be supplied to the interior of the frame 2 from a source of such gas shown at 18.

Normally any pressure of inert gas built up within the opening in the frame 2 is less than the ambient pressure so that some differential pressure is continually urging the cover sheet 13 inwardly of the frame 2 to retain the assembled components tightly against each other and to the shape of the curved support surface 5 of the base 4.

After the assembly has been made, as indicated in FIG. 1, then the entire jig unit can be moved into a suitable heating or brazing oven to heat the assembly of the core 9 and top and bottom cover sheets 10 and 11 to brazing temperature so that the brazing material 12 can be effectively heated and bond the top and bottom cover sheets to the exposed edges of the core 9. Or, if other type of adhesive bonding material is used, a similar heating action can be provided to activate such bonding agent. Thereafter, the jig 1 can be cooled in any desired manner to permit the bonding or brazing action to be completed. Next the weld, which is provided at the edges of the cover sheet 13 and angles 7, is removed, as by an edge grinding operation, and the cover sheet 13 is taken off the jig. This exposes the accurately contoured, unitary structure formed from the core 9 and top and bottom cover sheets 10 and 11, made from any suitable metal, thereon which will then be removed from the open center portion of the frame 2. Of course, such unitary assembly of metal parts will conform to the contour of the curved support surface 5 and it will have effective strength.

It will be seen that the cover sheet 13 still will be of exact size to line up with the lateral margins of the angles 7 so that the cover sheet 13 can be repeatedly used to secure the metal sandwich components together in the jig 1 in an air tight center chamber therein. The cover sheet 13, while contoured to the shape of the support surface 5, can adjust for minor variations in the height of the metal assembly in the jig 1 and of the side members 6. Hence, this apparatus can be used for forming a number of sandwich units to difficult single or double curvatures, or to other non-planar constructions by the use of the pre-contoured cover sheet 13 and associated components of the jig, as described herein.

It thus is believed that the objects of the invention have been achieved by the provision of the novel jig and bonding method of the invention so that a quantity of complexly curved sandwiches of the same shape can be prepared at low cost by positive forming and shaping techniques.

The honeycomb core 9 may be made from stainless steel, or other metal sheets or foil of up to .001 or .002 inch. The cover sheets 10 and 11 would usually be from .005 inch up in thickness.

The jig 1 may have an inlet and outlet to permit pumping of gas into and through the fixture, as desired. Dry hydrogen may be used as the gas in the chamber in the jig.

When placing the bottom sheet 11 in the jig 1, it is desirable to place a member underneath and extending from it to prevent any excessive brazing or adhesive material from bonding the metal sandwich to the jig. An unfired ceramic paper, such as "Fiberfrax," sold by the Carborundum Company, has been satisfactory for such purpose.

"Arcuate," in defining shapes in this specification, includes single and double curvature articles which may be of semi-spherical, elliptical, cylindrical, or other curved shapes.

While a certain representative embodiment and details have been shown for the purpose of illustrating the invention, it will be apparent to those skilled in this art that various changes and modifications may be made therein without departing from the spirit or scope of the invention.

What is claimed is:

1. A method of making a contoured sandwich from a flexible metal honeycomb and top and bottom cover sheets therefor comprising accurately and separately forming the top and bottom sheets to the desired contour, assembling a flexible metal honeycomb between flexible top and bottom metal cover sheets having thermoplastic bonding material on the inner surfaces thereof, said top and bottom sheets having been pre-formed to a desired contour other than planar, placing the assembly in a receiver having a support surface complementary to the contour of said top and bottom sheets and having a laterally outwardly extending upper edge, welding the periphery of a flexible metal cover sheet to the margin of the upper edge of the receiver to form an air tight chamber around said assembly by such flexible metal cover sheet and the receiver, said metal cover sheet having been preformed to substantially the contour of the support surface, at least partially evacuating such chamber so that said flexible metal cover sheet is forced against said assembly to hold it against said receiver and the complementary surface thereon, heating the entire chamber and assembly to bond the top and bottom sheets to said honeycomb, cooling the assembly, and removing the welded edges of said flexible metal cover sheet and receiver to permit removal of the arcuately contoured metal assembly and assembly of another sandwich.

2. The method of making an arcuately contoured sandwich from a flexible metal honeycomb and top and bottom cover sheets therefor which comprises separately and accurately forming the top and bottom cover sheets to the desired arcuate contour, coating the inner faces of the cover sheets with a thermally activated bonding material, assembling a flexible metal honeycomb between the cover sheets, placing the assembly in a jig having a rigid arcuate contoured support surface corresponding to the desired arcuate contour of one face of the sandwich and peripheral walls extending above said surface to the thickness of the desired sandwich, placing a flexible confining cover sheet of metal over the jig with the sandwich assembly therein, the flexible cover sheet being preformed to substantially the desired arcuate contour of the opposite face of the sandwich, sealing the margins of the confining cover sheet to the peripheral walls of the jig to provide an air-tight cavity, evacuating the cavity to clamp the sandwich assembly by differential atmospheric pressure, heating the jig with the assembly therein to fuse the bonding material, cooling the jig and assembled sandwich and removing the confining cover sheet to release the sandwich.

3. A method of making a contoured sandwich from a flexible metal honeycomb and top and bottom cover sheets therefor comprising accurately and separately forming the top and bottom cover sheets to the desired contour, assembling a flexible metal honeycomb between flexible top and bottom metal cover sheets having thermally activated bonding material on the inner surfaces thereof, said top and bottom sheets having been preformed to a desired contour other than planar, placing the assembly in a receiver having a support surface complementary to the contour of said top and bottom sheets and having a laterally outwardly extending continuous upper edge section, welding the peripheral edge of a flexible metal cover sheet to the periphery of said edge section of the receiver to form an air tight chamber around said assembly by such flexible metal cover sheet and the receiver, said metal cover sheet having been preformed to substantially the contour of the support surface, at least partially evacuating such chamber so that said flexible metal cover sheet is forced against said assembly to hold it against said receiver and the complementary surface thereon, heating the entire chamber and assembly to bond the top and bottom sheets to said honeycomb, grinding off the peripheral edge of the flexible metal cover sheet and of said edge section, and removing the cover sheet to permit removal of the contoured sandwich produced whereby another contoured sandwich can be made in the receiver by repeated use of the metal cover sheet by the above operations until the said edge section of the receiver is exhausted.

4. A method of making a contoured sandwich from a flexible metal honeycomb and top and bottom cover sheets therefor comprising accurately and separately forming the top and bottom cover sheets to the desired contour, assembling a flexible metal honeycomb between flexible top and bottom metal cover sheets having thermally activated bonding material on the inner surfaces thereof, said top and bottom sheets having been preformed to a desired contour other than planar, placing the assembly in a receiver having a support surface complementary to the contour of said top and bottom sheets and having an elevated laterally outwardly extending edge section encompassing the assembly and spaced from said support surface about the thickness of the assembly, welding the peripheral edge of a flexible metal cover sheet to the periphery of said edge section of the receiver to form an air tight chamber around said assembly by such flexible metal cover sheet and the receiver, the flexible cover sheet being preformed to substantially the contour of said support surface, at least partially evacuating such chamber so that said flexible metal cover sheet is forced against said assembly to hold it against said receiver and the complementary support surface thereon, heating the entire chamber and assembly and cooling to bond the top and bottom sheets to said honeycomb, and removing the peripheral edge of the flexible metal cover sheet and of said edge section and taking off the cover sheet to permit removal of the contoured sandwich assembly whereby another contoured sandwich can be made in the receiver by repeated use of the metal cover sheet by the above operations until the said edge section of the receiver is exhausted.

References Cited in the file of this patent

UNITED STATES PATENTS

| | | |
|---|---|---|
| 2,276,004 | Vidal et al. | Mar. 10, 1942 |
| 2,326,430 | Blanchard | Aug. 10, 1943 |
| 2,380,573 | Beasecker | July 31, 1945 |
| 2,609,068 | Pajack | Sept. 2, 1952 |
| 2,614,517 | Peterson | Oct. 21, 1952 |
| 2,644,777 | Havens | July 7, 1953 |
| 2,700,632 | Ackerlind | Jan. 25, 1955 |
| 2,746,139 | Van Pappelendam | May 22, 1956 |
| 2,756,496 | Holland | July 31, 1956 |
| 2,816,355 | Herman | Dec. 17, 1957 |
| 2,845,698 | Giovannucci et al. | Aug. 5, 1958 |
| 2,940,557 | Herbert | June 14, 1960 |
| 2,944,504 | Herman et al. | July 12, 1960 |
| 2,966,738 | Bertossa | Jan. 3, 1961 |
| 2,978,806 | Herbert | Apr. 11, 1961 |

FOREIGN PATENTS

| | | |
|---|---|---|
| 527,838 | Germany | June 22, 1931 |
| 443,696 | Great Britain | Mar. 4, 1936 |
| 750,610 | Great Britain | June 20, 1956 |